(12) United States Patent
Giurgiu et al.

(10) Patent No.: US 12,572,441 B2
(45) Date of Patent: Mar. 10, 2026

(54) FULLY UNSUPERVISED PIPELINE FOR CLUSTERING ANOMALIES DETECTED IN COMPUTERIZED SYSTEMS

(71) Applicant: INTERNATIONAL BUSINESS MACHINES CORPORATION, Armonk, NY (US)

(72) Inventors: Ioana Giurgiu, Zürich (CH); Artur Dox, Hofheim (DE); Mircea R. Gusat, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 17/812,453

(22) Filed: Jul. 14, 2022

(65) Prior Publication Data

US 2024/0020613 A1 Jan. 18, 2024

(51) Int. Cl.
  *G06F 11/34* (2006.01)
  *G06F 11/07* (2006.01)
  (Continued)

(52) U.S. Cl.
  CPC ........ *G06F 11/3419* (2013.01); *G06F 11/076* (2013.01); *G06F 18/2321* (2023.01); *G06N 3/0455* (2023.01); *G06N 3/0464* (2023.01)

(58) Field of Classification Search
  CPC ........... G06Q 10/06393; G06N 3/0464; G06N 3/0455; G06F 11/3419
  See application file for complete search history.

(56) References Cited

U.S. PATENT DOCUMENTS 10,643,138 B2    5/2020  Bellala
10,904,114 B2 *  1/2021  Thampy ............... G06N 3/0464
                        (Continued)

FOREIGN PATENT DOCUMENTS

CN      111914873 A     11/2020
WO    2021105799 A1     6/2021

OTHER PUBLICATIONS

S. He, B. Yang and Q. Qiao, "Overview of Key Performance Indicator Anomaly Detection," 2021 IEEE Region 10 Symposium (TENSYMP), Jeju, Korea, Republic of, 2021, pp. 1-6, doi: 10.1 109/TENSYMP 52854.2021.9550989 (Year: 2021).*
(Continued)

*Primary Examiner* — Omar F Fernandez Rivas
*Assistant Examiner* — Corey M Sackalosky
(74) *Attorney, Agent, or Firm* — Joseph P. Curcuru

(57)             ABSTRACT

The invention is notably directed to a computer-implemented method of clustering anomalies detected in a computerized system. The proposed method makes use of an unsupervised cognitive model, executed based on input datasets to obtain clusters of anomalies. The method accesses input datasets, which correspond to detected anomalies of the computerized system. These anomalies span respective time windows. Each input dataset comprises a set of timeseries of key performance indicators. The key performance indicators of each input dataset extend over a respective time window. That is, each anomaly corresponds to a respective time window. This model includes a first stage, which includes an encoder designed to learn fixed-size representations of input datasets, and a second stage, which is a clustering stage. The model is executed based on the input datasets accessed, the first stage learning fixed-size representations of the input datasets and the second stage clustering the learned representations.

20 Claims, 8 Drawing Sheets

(51) Int. Cl.
  G06F 18/2321 (2023.01)
  G06N 3/0455 (2023.01)
  G06N 3/0464 (2023.01)

(56) References Cited

U.S. PATENT DOCUMENTS

| | | | | |
|---|---|---|---|---|
| 11,636,125 | B1 * | 4/2023 | Carmona Perez ....... | G06N 3/08 |
| | | | | 707/736 |
| 2016/0342903 | A1 | 11/2016 | Shumpert | |
| 2020/0097810 | A1 | 3/2020 | Hetherington | |
| 2020/0250812 | A1 * | 8/2020 | Ceccaldi .............. | G06N 3/0464 |
| 2022/0019888 | A1 * | 1/2022 | Aggarwal .............. | G06N 3/088 |

OTHER PUBLICATIONS

"Patent Cooperation Treaty PCT International Search Report", Applicant's File Reference: P202104754, International Application No. PCT /IB2023/056601, International Filing Date: Jun. 27, 2023, Date of Mailing: Oct. 24, 2023, 7 pages.
Chandrakala et al., "A Density based Method for Multivariate Time Series Clustering in Kernel Feature Space," IEEE, 2008, https://ieeexplore.ieee.org/document/4634055, pp. 1885-1890.
Franceschi et al., "Unsupervised Scalable Representation Learning for Multivariate Time Series," 33rd Conference on Neural Information Processing Systems (NeurIPS 2019), arXiv:1901.10738v4 [cs.LG] Jan. 3, 2020, https://arxiv.org/pdf/1901.10738.pdf, 25 pages.
Giurgiu, "Efficient Clustering of Multivariate Variable Length Time Series with Representation Learning," ACM, Conference'17, Jul. 2017, https://dl.acm.org/doi/10.1145/1122445.1122456, 10 pages.
Kremer et al., "Mining of Temporal Coherent Subspace Clusters in Multivariate Time Series Databases," ResearchGate, Conference: Proceedings of the 16th Pacific-Asia conference on Advances in Knowledge Discovery and Data Mining—vol. Part I, May 2012, https://www.researchgate.net/publication/262216910, 13 pages.
Li et al., "Clustering-based Anomaly Detection in Multivariate Time Series Data," Applied Soft Computing Journal, 2020, https://doi.org/10.1016/j.asoc.2020.106919, 37 pages.
Ma et al., "Learning Representations for Time Series Clustering," 33rd Conference on Neural Information Processing Systems (NeurIPS 2019), https://papers.nips.cc/paper/2019/file/1359aa933b-48b754a2f54adb688bfa77-Paper.pdf, 11 pages.
Zhou et al., "A Model-Based Multivariate Time Series Clustering Algorithm," PAKDD 2014 Workshops, LNAI 8643, pp. 805-817, 2014, DOI: 10.1007/978-3-319-13186-3_72.

* cited by examiner

FULLY UNSUPERVISED PIPELINE FOR CLUSTERING ANOMALIES DETECTED IN COMPUTERIZED SYSTEMS

BACKGROUND

The present invention relates in general to the field of computer-implemented methods and computer program products for clustering anomalies detected in computerized systems. In particular, it is directed to a method relying on a fully unsupervised pipeline, which learns fixed-size representations of input datasets corresponding to sets of time-series of key performance indicators and clusters the learned representations to obtain clusters of anomalies.

Timeseries clustering is important where category labels are rarely or sparsely available and the ability to detect patterns is critical. Recently, deep learning models have shown notable results in supervised tasks, by using representation learning. However, ensuring that such a representation is cluster-friendly and effectively captures the temporal and multi-dimensional dynamics of variable length timeseries remains a challenge.

SUMMARY

According to a first aspect, the present invention is embodied as a computer-implemented method of clustering anomalies detected in a computerized system. The proposed method makes use of an unsupervised cognitive model, which is executed based on input datasets to obtain clusters of anomalies. The input datasets are accessed by the method; they correspond to detected anomalies of the computerized system. These anomalies span respective time windows. Each of the corresponding input datasets comprises a set of timeseries of key performance indicators (KPIs). The KPIs of each input dataset extend over a respective time window. That is, each anomaly corresponds to a respective time window. The unsupervised cognitive model is loaded (e.g., in the main memory of a computer performing the method), prior to executing it. This model includes a first stage and a second stage. The first stage includes an encoder designed to learn fixed-size representations of input datasets, while the second stage is a clustering stage. The model is executed based on the input datasets accessed, so as for the first stage to learn fixed-size representations of the input datasets and the second stage to cluster the learned representations, such that clusters of anomalies are eventually obtained by the method.

In embodiments, the unsupervised cognitive model is executed using a composed loss function, which combines a first loss function and a second loss function. The first loss function and the second loss function are designed for optimizing the representations and the clusters, respectively.

Preferably, the first loss function is designed as a triplet loss function. The latter ensures that the representation learned for a reference portion of each dataset of the input datasets (corresponding to respective anomalies) is, on average, closer to the representations learned for distinct portions of said each dataset than to the representations learned for other portions of other ones of the input datasets. Each of the reference portion, the distinct portions, and the other portions corresponds to a respective time segment. Still, each portion aggregates several KPIs, i.e., all KPIs of the respective anomaly (albeit extending over a certain time segment). The representation learned for each reference portion can serve as a representation of the corresponding anomaly. As a result, the representation learned for a reference anomaly is, on average, closer to the representations learned for other similar anomalies than to the representations learned for dissimilar anomalies.

According to another aspect, the invention is embodied as a computer program for clustering anomalies detected in a computerized system. The computer program product comprises a computer readable storage medium having program instructions embodied therewith. The program instructions are executable by processing means to cause the latter to perform a method such as described above.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the Figures have been allocated the same numeral references, unless otherwise indicated.

Computerized methods and computer program products embodying the present invention will now be described, by way of non-limiting examples.

DETAILED DESCRIPTION

A first aspect of the invention is now described in detail, in reference to FIGS. 1-3, and 6. This aspect concerns computer-implemented methods of clustering anomalies detected in a computerized system. Note, the present method and its variants are collectively referred to as the "present methods."

Formally, anomalies are defined as rare events that are so different from other observations that they raise suspicion concerning the mechanism that generated them. Anomalies may arise due to malicious or improper actions, frauds, or system failures, for example. An anomaly may notably be a data traffic anomaly, such as occurring during a network attack (e.g., on the business environment), an unauthorized access, a network intrusion, an improper data disclosure, a data leakage, a system malfunction, or a data and/or resources deletion. Anomaly detection is important in various domains, such as cybersecurity, fraud detection, and healthcare. An early detection is often of utmost importance as failing to act upon the causes of the anomaly can cause significant harm.

The present methods may for example be performed at a given computer 1 (see FIG. 1), which interacts with a target computerized system 2, i.e., the system of interest, for which anomalies may be detected and analyzed. The computerized system 2 may for instance involve networked computerized devices, e.g., enabling cloud computing, as assumed in FIG. 1. In variants, the system 2 may be a datacenter, supercomputer, general-purpose computer, memory and storage hardware, load/store engine, or any other type of computerized device or system. Note, the computer implementing the present methods (i.e., computer 1 in FIG. 1) may possibly form part of the computerized system 2 of interest.

The present methods rely on KPIs of the computerized system 2. The KPIs are typically obtained from compute devices and/or storage devices composing the system 2. For example, such KPIs may be continuously monitored, by monitoring S10 the computerized system 2. The monitored signals or data may for instance consist of or include monotonic sequences or tabular data, the aim being to be able to detect potential anomalies in the system 2. The KPI values of the KPIs form respective timeseries. Each KPI normally corresponds to a respective quantity, such that the respective timeseries will normally be univariate. However, a KPI may, in principle, also correspond to a multivariate timeseries.

Figure 4:
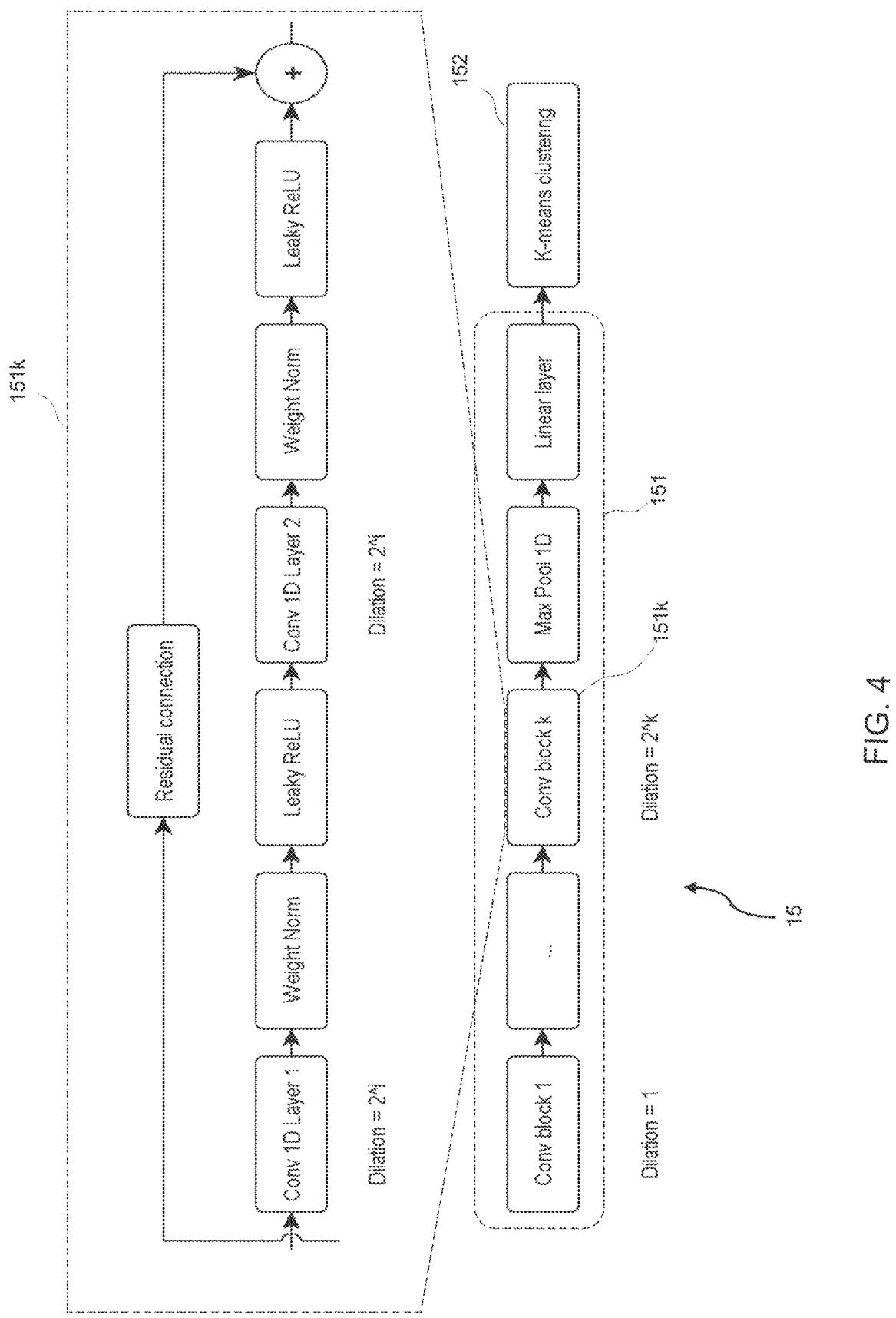
FIG. 4 is a more detail diagram of the model of FIG. 3, illustrating a preferred structure of the first stage (dedicated to representation learning) of the model.

The following assumes that each KPI corresponds to a univariate timeseries, for simplicity. A timeseries is a series of values (the KPI values) of a given quantity (the KPI) obtained at successive times, as illustrated in FIG. 4 for N univariate KPIs (noted $KPI_1$ to $KPI_N$). Such KPI values may for instance be continuously collected and aggregated from data streams of raw KPI values. The aggregated values are typically subject to some preprocessing. Note, the whole set of KPIs can, as a whole, be regarded as a multivariate timeseries.

Figure 2:
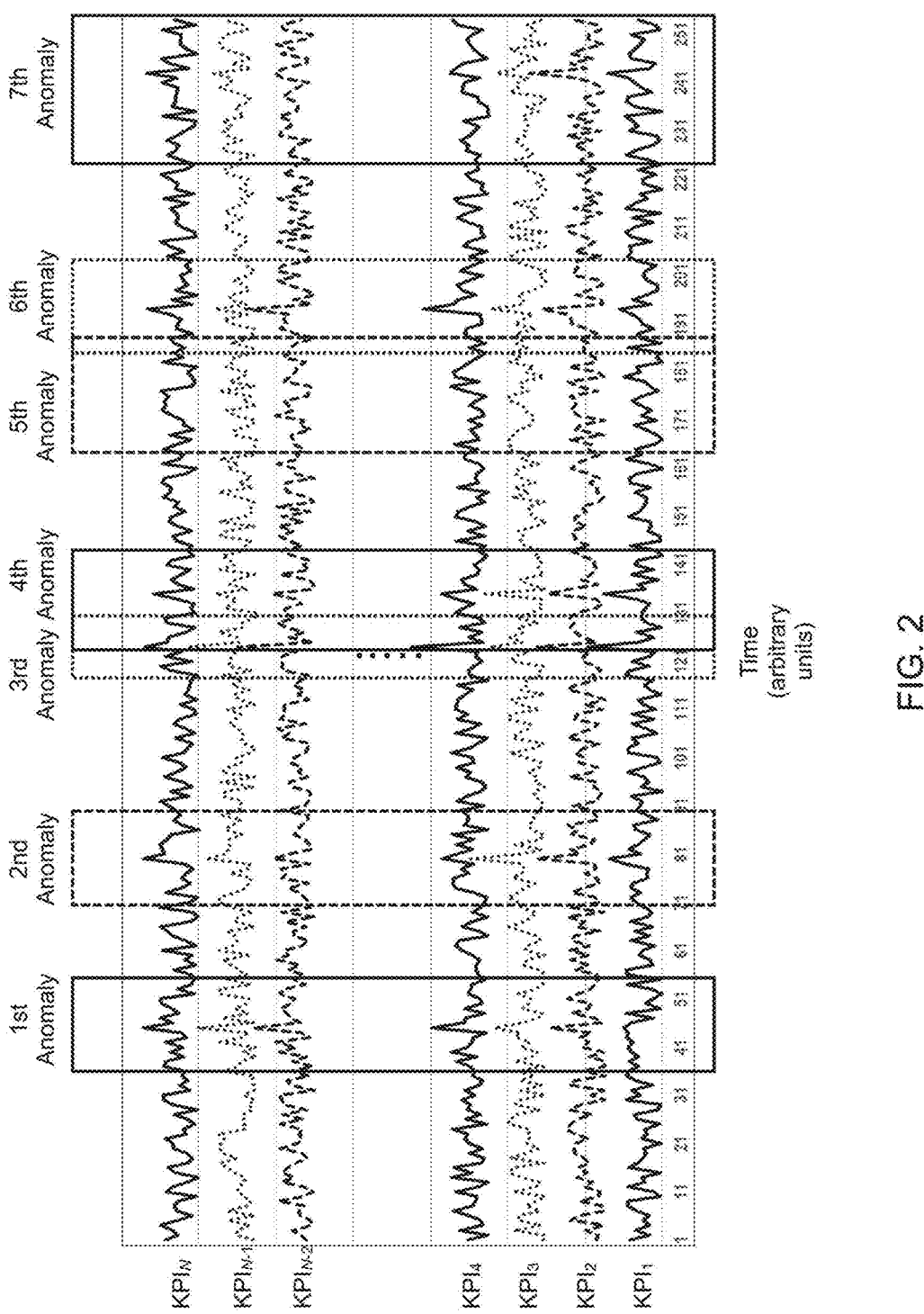
FIG. 2 is a graph representing various KPIs evolving over a given time period. The KPI values form respective (univariate) timeseries. Seven anomalies are assumed to have been detected based on such KPIs over this time period. The anomalies are depicted as corresponding time windows, as used in embodiments.

Thus, the present methods may come to detect an anomaly (step S10 in FIG. 6) in the computerized system 2, based on the monitored KPIs. Any suitable anomaly detection algorithm may be used. This algorithm may for instance reflect a model, possibly an analytical model. Various examples of anomaly detection algorithms and pipelines are known. FIG. 2 assumes that seven anomalies are being detected, at different time points, over a large time period. The detected anomalies are depicted as corresponding time windows, which may span distinct time periods and may further overlap.

When an anomaly is detected, the present methods may automatically determine (or causes to determine) a corresponding time window, which extends over a given time period. A time window is typically determined as endpoints of a certain time interval. Ad hoc heuristics may be used to determine such a time window. The determined window may be subject to validation by an expert (system or human), if necessary. That is, the present methods may automatically determine troubleshooting time windows and prompt an expert to validate them. In variants, anomalies are detected by another entity (e.g., another computer), and provided as inputs to a computer implementing an anomaly clustering method as described below.

In all of the scenarios evoked above, the clustering method will access (step S20, FIG. 6) input datasets corresponding to detected anomalies of the computerized system 2. The detected anomalies span respective time windows (which may possibly differ and overlap). That is, each input dataset includes a set of timeseries of KPIs and corresponds to a detected anomaly. All KPIs of a same input dataset extends over a same time window. Each input dataset may be regarded as a multivariate timeseries.

Figure 3:
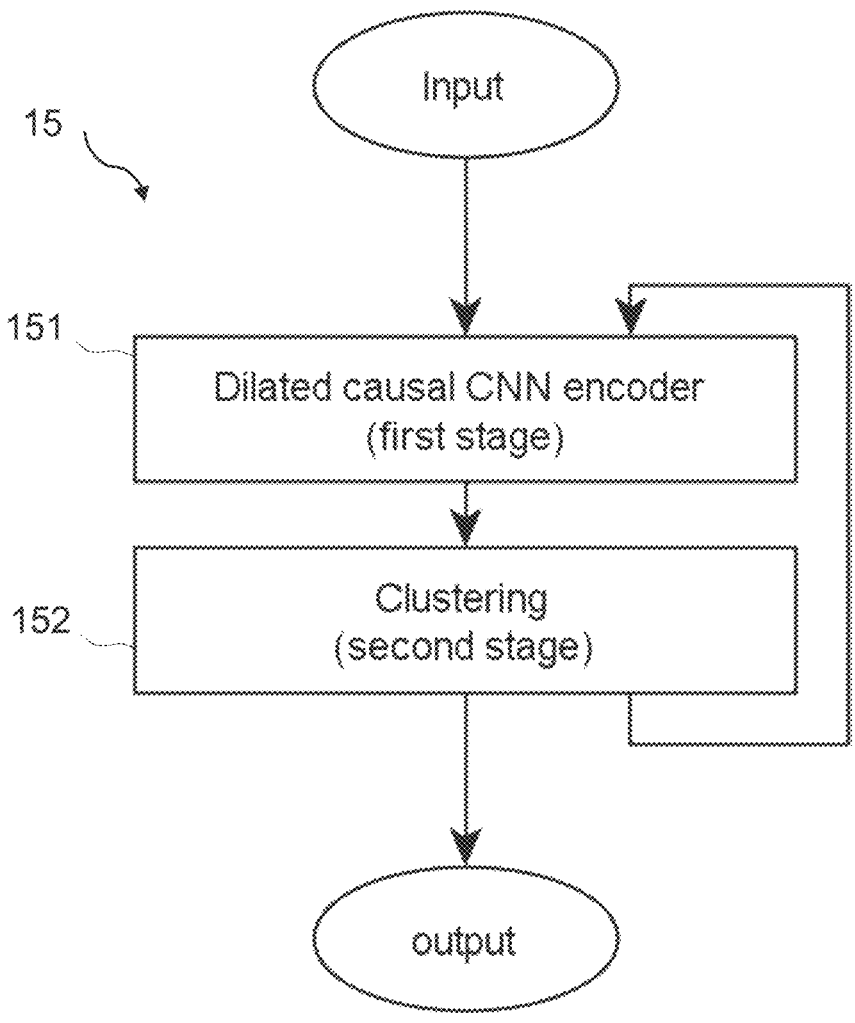
FIG. 3 is a high-level diagram of the unsupervised, two-stage model used to learn representations of the anomalies and cluster such anomalies, as in embodiments.

The method relies on an unsupervised cognitive model 15, which is loaded at step S32, e.g., in the main memory of the computer 1, with a view to subsequently executing the model. Note, in practice, the model 15 may be loaded prior to accessing S20 the input datasets of interest. The unsupervised cognitive model 15 includes a first stage 151 and a second stage 152, as schematically shown in FIGS. 3 and 4. The first stage 151 involves an encoder (i.e., a feature extractor), which is designed to learn representations of input datasets. Importantly, the encoder is here designed to learn fixed-size representations of the input datasets. The second stage 152 is a clustering stage. Suitable examples of encoders and clustering stages are described later in detail.

The unsupervised cognitive model 15 is then executed based on the input datasets accessed at step S20. The two-stage structure of the model 15 causes the first stage 151 to learn (step S33 of FIG. 6) representations of the input datasets. As per the design of the encoder, the representations learned are fixed-size representations, something that eases the subsequent clustering process. I.e., the second stage 152 causes to cluster (step S35) the learned representations, such that clusters of anomalies are eventually obtained (step S40).

The proposed approach advantageously relies on a fully unsupervised pipeline: the model 15 learns the fixed-size representations of the input datasets, whereby features of the input datasets are extracted, e.g., as 1D or 2D arrays (i.e., vectors or matrices). Preferably, the encoder is designed to extract features as 1D arrays, to facilitate the subsequent clustering process performed by the second stage 152. In practice, dozens to hundreds of input datasets (corresponding to respective anomalies) may possibly be fed to the model 15, where such input datasets may have time windows of different lengths and such time windows may possibly overlap, as assumed in FIG. 2 (compare the $3^{rd}$, $4^{th}$, $5^{th}$, and $6^{th}$ anomalies).

That is, the encoder (first stage) may allow useful representations (e.g., vectors) to be learned, which have fixed-size representations, irrespective of the time window characteristics of the input datasets, something that is very convenient in practice. In other words, the encoder makes it possible to compare datasets that are hardly comparable, a priori. In particular, a fast encoder-only CNN with dilated causal convolutions can be used to handle long timeseries, which may possibly overlap and have variable lengths, as in embodiments discussed below. "Encoder-only" means that no decoder is involved, as opposed to encoder-decoder architectures. Eventually, fixed-size representations of the input datasets may be extracted from the input datasets thanks to the encoder, such that the representations can then simply be clustered. Thanks to the fixed-size representations learned (notwithstanding the different time durations and overlapping time windows), any clustering method may be contemplated, in principle. However, preferred clustering methods are disclosed herein, which can advantageously be used in the present context.

The model 15 is designed to generate meaningful clusters of anomalies, which typically correspond to different types of anomalies. I.e., the clustering can be performed so as to identify groups of anomalies, reflecting different kinds of anomalous behaviors, which eases subsequent investigations by support engineers. The clusters obtained ease the anomaly analysis, inasmuch as timeseries belonging to same clusters can be assumed to reflect the same anomaly types.

Of advantage is that the two-stage architecture of the model 15 lends itself well to an iterative and alternated training based on a composed loss function, as discussed below in reference to preferred embodiments. In particular, anomaly representations can be optimized together with a clustering objective, using a novel triplet loss function and an iterative, alternated training scheme, which is computationally tractable for real systems. Thus, the present methods can be used to automate, at least partly, the deeply involved analysis of anomalous events as occurring in complex systems such as cloud infrastructures. Beyond could infrastructures, however, the present methods can be applied to datacenters, supercomputers, general-purpose computers, memory and storage hardware, load/store engine, or any other type of computerized device or system, as noted earlier.

All this is now described in detail, in reference to particular embodiments of the invention. To start with, the unsupervised cognitive model 15 may preferably be executed using a composed loss function. This composed loss function may combine a first loss function and a second loss function. The first loss function may be designed (and used) for optimizing the learned representations, while the second loss function may aim at optimizing the clusters obtained in fine. i.e., the second loss function incorporates the clustering task.

In practice, the combined loss may be written as a mathematical function taking two loss functions as arguments. The combined loss function is typically a sum of two losses, one of which aims at learning suitable representations, while the other minimizes the clustering loss. The first loss function may advantageously decompose into two terms, to allow a time-based negative sampling, as in preferred embodiments discussed below. Thus, the composed loss function may actually involve three functions.

Using a composed loss function as described above makes it possible to simultaneously optimize for representation learning (i.e., learning fixed-length representations) and clustering. Accordingly, the composed loss function may aim at both learning suitable representations of the anomalies and obtain good quality clusters. This may preferably be achieved through an iterative and alternated scheme, as discussed below. Using an iterative process makes the training computationally more tractable.

In a preferred embodiment, the second stage may consist of one or more layers on top of the encoder layers, hence forming a single network 15, which can nevertheless be alternatively optimized for representation learning and clustering. This is illustrated in FIGS. 3 and 4.

In more detail, the first loss function is preferably designed as a triplet loss function, which ensures that the representation learned for a reference portion (or chunk) of each input dataset (corresponding to a respective anomaly) is, on average, closer to the representations learned for distinct portions of that same input dataset than to the representations learned for other portions of other (i.e., distinct) input datasets. Each of the above portions may correspond to a respective time segment. Still, each portion may aggregate several KPIs, i.e., all KPIs of the respective anomaly (albeit extending over a certain time segment). Thus, the representation learned for each reference portion can serve as a representation of the corresponding anomaly. As a result, the representation learned for a reference anomaly is, on average, closer to the representations learned for other similar anomalies than to the representations learned for dissimilar anomalies. Such a triplet loss function involves a time-based negative sampling. As a result, the representations learned are closer for those anomalies that eventually belong to the same cluster, else the representations are farther.

Using a triplet loss algorithm as described above proved to work surprisingly well. The same model can be used for all types of anomalies. The trained cognitive model that results is thus agnostic to anomaly types. Composed losses have already been used for representation learning. However, composed loss function are typically not used in the context of temporal data (timeseries) and even less so in a fully unsupervised setting.

In more detail, a preferred approach is one where the triplet loss function ensures that the representation of a reference portion, noted $y^{ref}$, of a given input dataset $y_i$, is closer to the representations learned for distinct portions of that same input dataset than portions of other datasets. Each portion corresponds to a certain time segment, it being noted that the various time segments involved may have distinct time lengths. Again, $y_i$ may be regarded as corresponding to a multivariate timeseries, while the KPIs it contains will typically be univariate timeseries. In turn, the representation learned for $y^{ref}$ can be taken as the representation (e.g., vector) of the whole dataset, i.e., the whole anomaly. That is, each anomaly can be represented by the representation learned for any reference portion thereof. The same may be performed for each input dataset to allow the subsequent clustering of all the input datasets.

In practice, one may, for example, consider a given portion $y^{ref}$ of a given input dataset $y_i$, where $y^{ref}$ can be randomly chosen. Then, the composed loss needs to ensure that the representation of $y^{ref}$ remains close to any distinct portion $y^{pos}$ of that same dataset, while being distant from a portion $y^{neg}$ chosen from another dataset $y_j$. One may advantageously consider multiple negative samples to increase the stability of the training step and ensure a higher degree of separation in the learned representations of series belonging to different clusters. In turn, distances between the various series can be computed according to any suitable metric. This metric can notably be selected so as to avoid insidious dimensionality effects, if necessary. Preferably, an angular cosine distance is used, as illustrated later.

For example, the first loss (triplet loss) function can be expressed as:

$$L_{repr}^{y^{ref}} = -\log(\sigma(f(y^{ref},\theta)^T f(y^{pos},\theta))) - \Sigma_{p=1}^{P} \log(\sigma(-f(y^{ref},\theta)^T f(y_p^{neg},\theta))),$$

where $\theta$ denotes the parameters of the encoder and $\sigma$ is the sigmoid function. The goal is to push the learned representations to distinguish between $y^{ref}$ and $y^{neg}$, while at the same time assimilate $y^{ref}$ and $y^{pos}$. The length of $y^{neg}$ samples can be chosen to match that of $y^{pos}$, in order to speed the training process. An example of suitable process of choosing $y^{ref}$, $y^{pos}$ and $\{y^{neg}\}_p$ is shown in Algorithm 1 below.

Algorithm 1. Choosing $y^{ref}$, $y^{pos}$ and $\{y^{ne}Y\}_p$ within an epoch

1: for $i \in [1, N]$ with $s_i = size(y_i)$ do
2: $s_{pos} = len(y^{pos}) \in [1, s_i]$
3: $s_{ref} = len(y^{ref}) \in [s_{pos}, s_i]$
4: Choose $y^{ref}$ randomly from $y_i$ with $s_{ref}$
5: Choose $^{pos}$ randomly from $y_i$ with $s_{pos}$
6: Choose $s_p^{neg} = len(y_p^{neg}) \in [1, len(y_p)]$
7: Choose $y_p^{neg}$ from $y_p$ with $s_p^{neg}$ and $\cos_{sim}(y_p^{neg}, y^{ref}) < th$ That is, $y^{pos}$ is chosen randomly from the same input dataset as $y^{ref}$ and cosine similarity ($\cos_{sim}$) is used to select $\{y^{neg}\}_p$. More specifically, if the similarity between $y_p^{neg}$ and $y^{ref}$ is lower than a threshold th, then $y_p^{neg}$ is a desirable negative sample to be used in the representation learning process (i.e., the closer is the cosine similarity to 0, the less similar the compared series are). One may for instance set th to 0.4. The selection process of $\{y^{neg}\}_p$ completes once P subseries have been found, which fulfill the similarity constraint. In the exceptional case where this is not possible (i.e., the series in the dataset are too similar), one may reduce the threshold th with exponential decay and repeat the process. Several variants of the above algorithm can be contemplated, as the one skilled in the art will appreciate.

Figure 6:
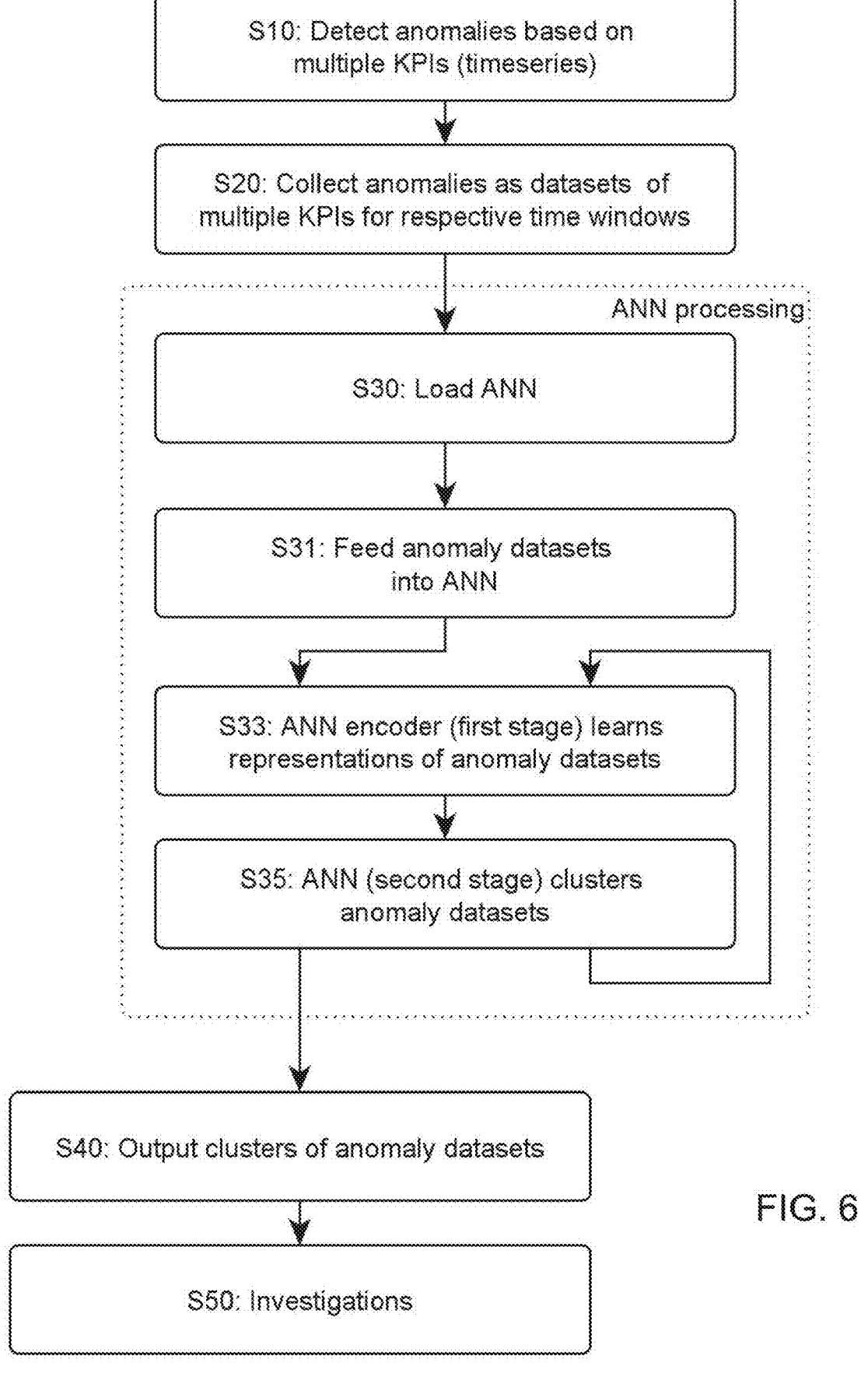
FIG. 6 is a flowchart illustrating high-level steps of a method of clustering anomalies according to embodiments.

Referring now more specifically to FIGS. 3 and 6, the unsupervised cognitive model 15 is preferably executed in an alternate, iterative manner. Namely, the execution of the model 15 may cause to alternately execute the first stage 151 (step S33 in FIG. 6) and the second stage 152 (step S35), and repeatedly execute the two stages 151, 152 (the process loops back to step S33), such that several iterations are performed. Accordingly, the representations learned, and the clusters obtained, are alternately optimized S33, S35 through several iterations. The objective of the optimization performed may be to decrease the composed loss function.

Figure 7:
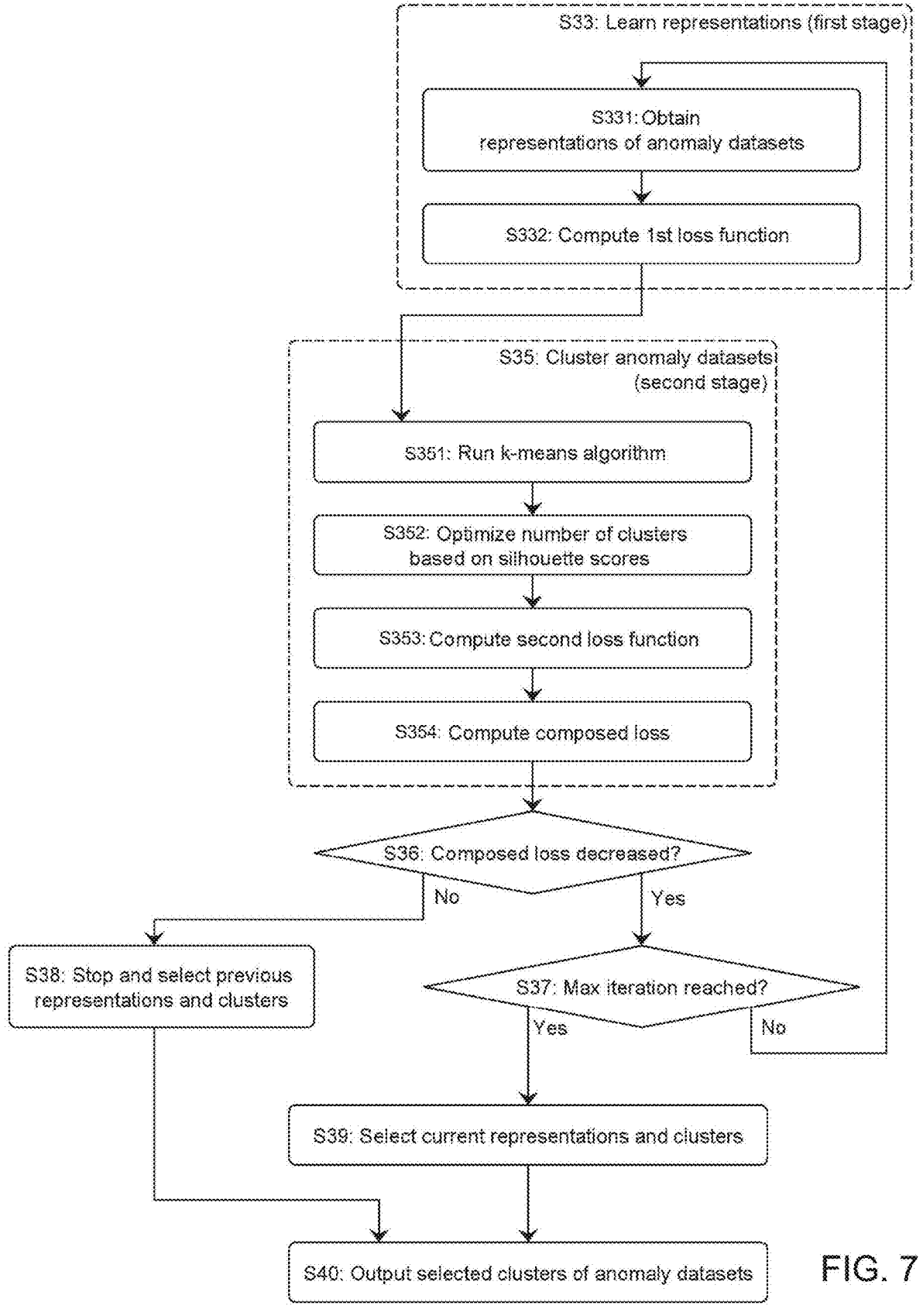
FIG. 7 is a flowchart illustrating lower-level steps of the first stage and the second stage of the unsupervised model, relying on a combined loss function, as in embodiments.

As illustrated in FIG. 7, at each iteration, the first loss function and the second loss function can be alternately computed (steps S332 and S353, respectively), at the first stage and the second stage, respectively, so as to eventually obtain the composed loss (step S354). Ideally, the objective would be to fully minimize the composed loss function. However, an early stopping strategy is preferably adopted (as assumed in FIG. 7), to lower computations, such that the composed loss function may not be fully minimized when stopping.

Moreover, the unsupervised cognitive model 15 may preferably be executed so as to achieve predefined structural properties of the clusters. Such predefined structural properties may for instance be achieved based on silhouette scores of the clusters.

FIG. 7 illustrates a preferred process, according to which each iteration may cause, at the first stage 151, obtaining (step S331) representations of the input datasets, followed by the calculation (step S332) of a first loss (using the first loss function), based on the representations obtained. The second stage 152 preferably involves a k-means algorithm. That is, a k-means algorithm is run at step S351, based on the previously obtained representations, prior to optimizing S352 the number of clusters based on silhouette scores obtained for the clusters. Next, a second loss can be computed S353, using the second loss function, whereby the current composed loss can be computed at step S354, based on the first loss and the second loss.

Figure 5:
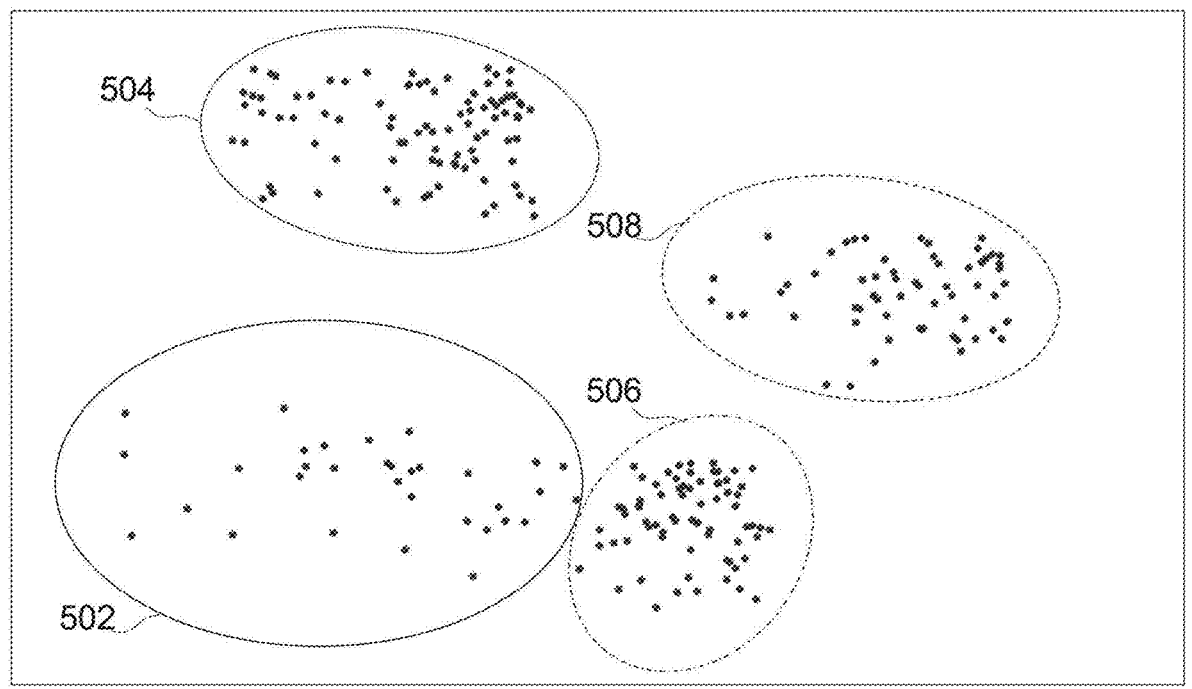
FIG. 5 is a 2D plot of examples of clusters of anomaly obtained in embodiments.

As mentioned above, an early stopping strategy may preferably be used to limit computations. That is, at step S36, the algorithm may decide S36 whether to stop S38 the training by comparing the current composed loss with the previous composed loss, i.e., the loss obtained during the previous iteration. A default loss value may be used at the very first iteration. In detail, at each iteration, the algorithm may check whether the composed loss has decreased (step S36). If so (S36: Yes), the algorithm may check S37 whether a predetermined maximal number of iteration has been reached. If this is indeed the case (S37: Yes), the process stops; the algorithm selects S39 and returns S40 the current representations and clusters. If not (S37: No), another iteration is started, whereby new representations are computed, step S331. If, during an iteration, the composed loss if found not to decrease any longer (S36: No), then the iterative process is stopped S38, and the algorithm selects S38 the previously obtained representations and clusters. Eventually, the algorithm returns S40 optimized clusters. FIG. 5 schematically depicts examples of clusters (502 to 508) obtained, as projected in a 2D plane, using dimension reduction techniques.

To sum up, the cognitive model 15 may advantageously be trained in an iterative and alternate manner, based on a combined loss functions, using an early stopping strategy. Such a scheme can be regarded as aiming at two objectives. The first objective is to minimize the total loss corresponding to the composed loss function, while the second objective is to achieve predefined structural properties of the clusters obtained via the second stage. By training the network on a variety of input lengths ranging from the shortest to the longest timeseries, the network gradually becomes able to output meaningful representations, regardless of the input length of the input timeseries.

As further seen in FIG. 6, the clusters returned by the algorithm may subsequently be used, e.g., by support engineers to investigate S50 the anomalies. In particular, the support engineers may attempt to identify S50 types of anomalies corresponding to each of the clusters obtained at step S40. If necessary, the method may further comprise instructing to take action in respect of the target computerized system 2, based on the types of anomalies identified. This may lead to modify a functioning of the computerized system 2, the aim being to best address the anomalies observed.

As illustrated in FIG. 4, the encoder (first stage 151) is preferably configured as an exponentially dilated, causal convolutional neural network. In particular, the first stage 151 may include k convolution blocks 151k, where k≥2. In practice, however, the number k of convolution blocks 151k is typically larger than or equal to three. Each convolution block 151k may comprise one or more dilated causal convolutional layers. That is, in each block, each layer has a dilation parameter of the type $2^i$ for layer i. The dilated temporal convolutional filter layers enable causal convolutions, with increasing dilation factors.

As further seen in FIG. 4, the first stage 151 may include a hierarchy of neural layers arranged in output of each of the dilated causal convolutional layers. In particular, this hierarchy of neural layers may include a weight normalization ("WeightNorm") layer and an activation layer. The activation layer may for instance be a leaky rectified linear unit (leaky ReLU). The structure can repeat, whereby each convolution layer is followed by a weight normalization layer and an activation layer, itself followed by another convolution layer.

The example of FIG. 4 assumes that each convolution block 151k includes two connected sub-blocks, each including a convolution layer, a weight normalization layer, and an activation layer. In addition, the first stage 151 may advantageously include a global max pooling layer ("Max Pool 1D") arranged in output of the k convolution blocks 151*k*. This layer squeezes the temporal dimension and aggregates all temporal information in a fixed-sized array, e.g., a fixed-sized vector, as assumed in the following. In that respect, a linear transformation layer ("Linear layer") may be provided in output of the global max pooling layer. The linear transformation of the vector represents the learned representation, which is passed to the clustering stage 152 to perform the clustering task. In principle, any clustering algorithm can be used—with no specific considerations for temporal data, different sampling frequencies or lengths—since the learned representations are fixed length and comparable in the target space.

To sum up, the first stage may preferably be configured in such a manner that each layer is a combination of causal convolutions, weight normalizations, leaky ReLUs, and residual connections, as shown in FIG. 4, where each layer has a dilation parameter of the type $2^i$ for layer i. The output of the first-stage network 151 is then passed through a global max pooling layer, which squeezes the temporal dimension and aggregates all temporal information in a fixed-sized vector. The linear transformation represents the learned representation, which is passed to the clustering stage 152 that performs the clustering task.

Such an encoder may ensure that similar representations are extracted from similar timeseries, without any supervision to learn such similarity. Note, the unsupervised cognitive model 15 may still, as a whole, be designed as a single network. That is, the second stage 152 may be implemented by outer neural layers connected in output of the first stage 151, as assumed in FIG. 4. The resulting network can nevertheless be trained using an iterative training scheme, based on a composed loss function, as discussed above.

By contrast, most existing approaches treat representation learning and clustering as separate and consecutive tasks. Such models optimize to generate representations that only minimize the reconstruction loss of the decoder. Not only such models result in larger computational costs, incurred by the training and inference when using a decoder (instead, an encoder-only architecture is used in the above architecture) but, all the more, the clustering objective is not actively considered in the representation learning process.

Figure 8:
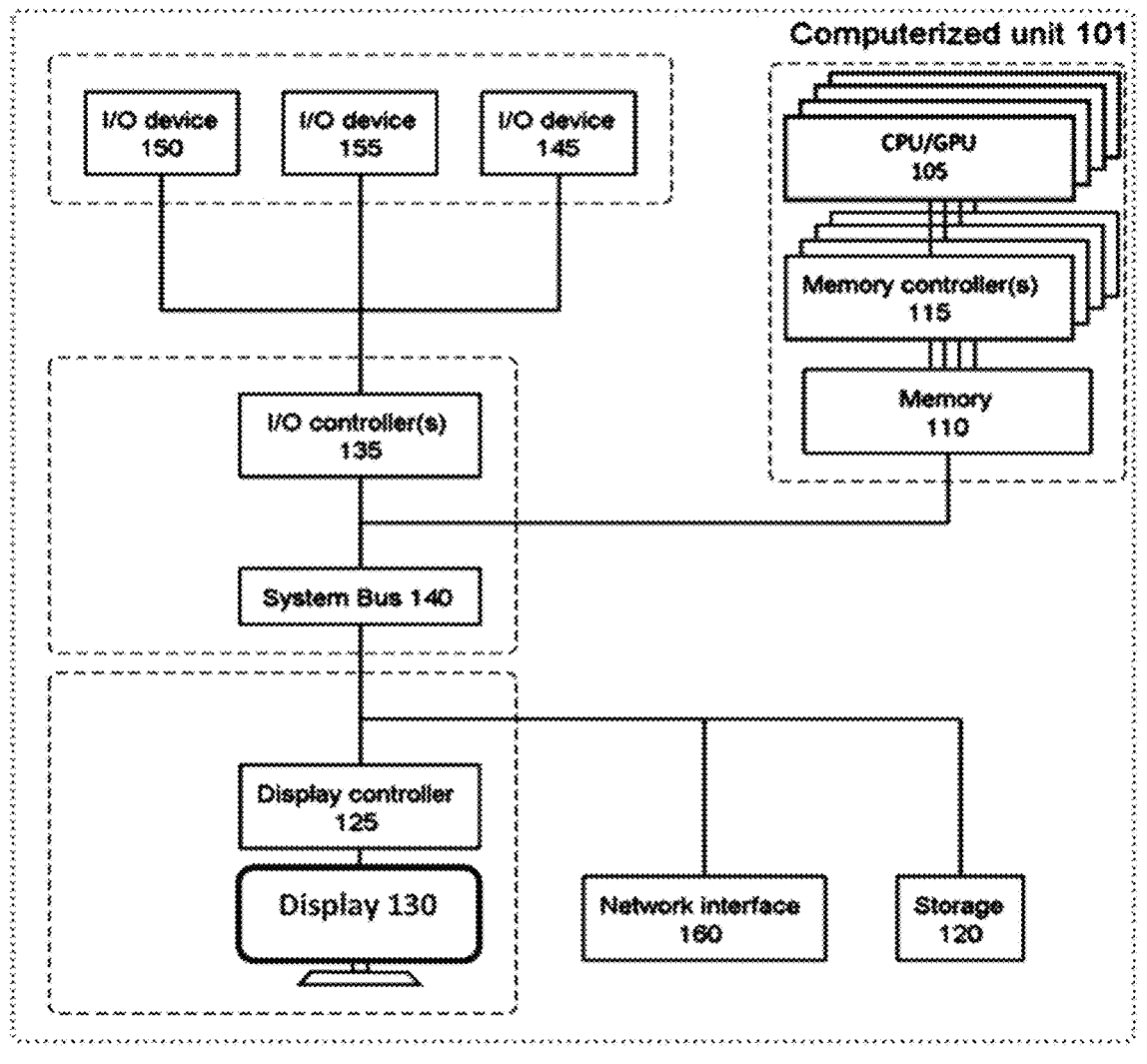
FIG. 8 schematically represents a general-purpose computerized system, suited for implementing one or more method steps as involved in embodiments of the invention.

Next, according to another aspect, the invention can be embodied as a computer program for clustering anomalies detected in a computerized system. The computer program product computer program product comprises a computer readable storage medium, which has program instructions embodied therewith. Such instructions typically form a software, e.g., stored in the storage 120 of a computerized unit such as shown in FIG. 8, e.g., corresponding to the computer 1 in FIG. 1. The program instructions can be executed by processing means 105 of such a unit 101 to cause the latter to perform steps according to the present methods. Additional features of this computer program product are described in section 3.2.

Preferred embodiments rely on a fully unsupervised and efficient approach that simultaneously optimizes for both representation learning and clustering tasks. This is achieved by combining a stacked dilated causal convolutional neural network (CNN) encoder-only architecture with a composed loss function with cosine similarity-based negative sampling and iterative training.

The proposed architecture may learn non-linear temporal representations for clustering of variable length time series in a fully unsupervised setting. A particularly appealing feature of this approach is in the integration (via an efficient composed loss function) and simultaneous optimization (through iterative training) of the representation learning and clustering tasks, thanks to a network based on an encoder formed by dilated convolutions.

Such an approach outperforms existing methods in at least 70% of the cases and is comparable otherwise. Such experiments have illustrated the model's effectiveness when compared to state-of-the-art classic and deep-learning clustering methods. In particular, the efficiency and scalability of this approach has been assessed and proved based on series including millions of datapoints. For completeness, the present inventors have reduced the present invention to practice and implemented it for real-life industrial applications, starting with cloud computing platforms.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

Figure 1:
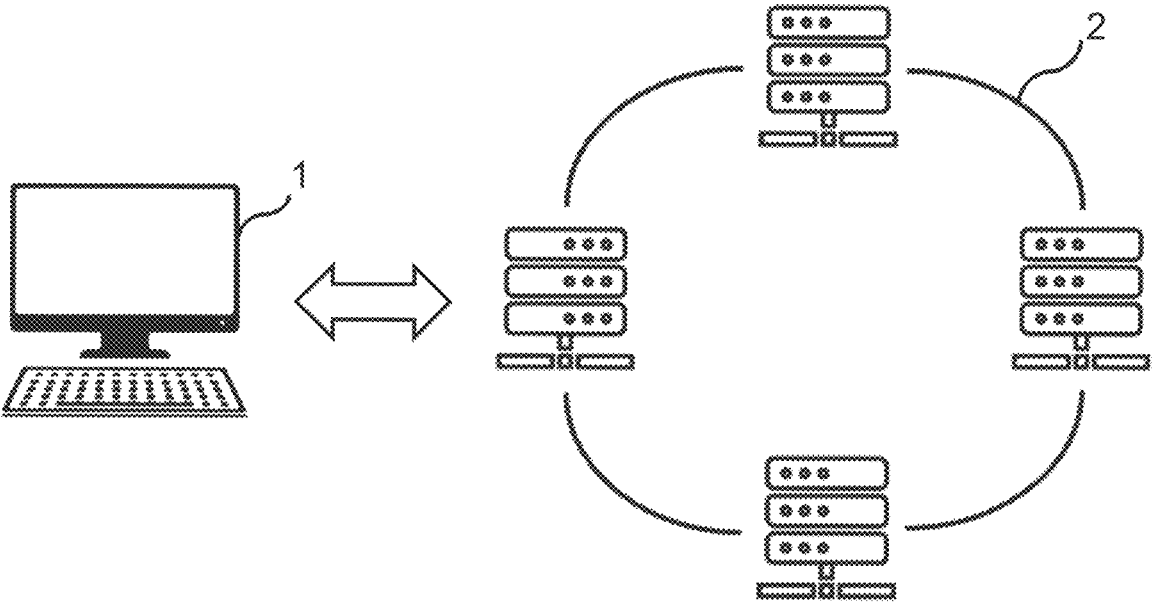
FIG. 1 schematically illustrates a computer interacting with a computerized system of interest, with a view to clustering anomalies detected for the computerized system of interest, as in embodiments.

For instance, each of the systems 1 and 2 shown in FIG. 1 may comprise one or more computerized units 101 (e.g., general- or specific-purpose computers), such as shown in FIG. 8. Each unit 101 may interact with other, typically similar units 101, to perform steps according to the present methods.

In exemplary embodiments, in terms of hardware architecture, as shown in FIG. 8, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) may be communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 may be hardware devices for executing software, including instructions such as coming as part of computerized tasks triggered by machine learning algorithms. The processors 105 can be any custom made or commercially available processor(s). In general, they may involve any type of semiconductor-based microprocessor (in the form of a microchip or chip set), or more generally any device for executing software instructions, including quantum processing devices.

The memory 110 may typically include volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 8, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, I/O control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. The computerized unit 101 may also include a network interface or transceiver 160 for coupling to a network (not shown), to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network, an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

The present invention may be a method, and/or a computer program product. The computer program product may include a computer readable storage medium (or media) having computer readable program instructions thereon for causing processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN or the connection may be made to an external computer (for example, through the Internet using an Internet Service Provider). In some embodiments, electronic circuitry including, for example, programmable logic circuitry, field-programmable gate arrays, or programmable logic arrays may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of clustering anomalies detected in a computerized system, wherein the method comprises:

accessing input datasets corresponding to detected anomalies of the computerized system, wherein the anomalies span respective time windows and each of the corresponding input datasets comprises a set of timeseries of key performance indicators extending over a respective one of the time windows;

loading an unsupervised cognitive model, wherein the model includes a first stage and a second stage, wherein the first stage includes an encoder designed to learn fixed-size representations of given datasets and the second stage is a clustering stage, wherein the unsupervised cognitive model is trained in an iterative and alternate manner, based on a combined loss functions, using an early stopping strategy, wherein the model is established by combining a stacked dilated causal convolutional neural network (CNN) encoder-only architecture with a composed loss function with cosine similarity-based negative sampling and the iterative training; and executing the unsupervised cognitive model based on the input datasets accessed for the first stage to learn fixed-size representations of the input datasets and the second stage to cluster the learned representations, to obtain clusters of anomalies.

2. The method according to claim 1, wherein:

the unsupervised cognitive model is executed using a composed loss function combining a first loss function and a second loss function; and the first loss function and the second loss function are respectively designed for optimizing the representations and the clusters.

3. The method according to claim 2, wherein:

the first loss function is designed as a triplet loss function ensuring that the representation learned for a reference portion of each dataset of the input datasets is, on average, closer to the representations learned for distinct portions of said each dataset than to the representations learned for other portions of other ones of the input datasets, wherein each of the reference portion, the distinct portions, and the other portions, corresponds to a respective time segment.

4. The method according to claim 2, wherein:

the unsupervised cognitive model is executed by alternately executing the first stage and the second stage, iteratively, with an objective to decrease the composed loss function, such that the representations learned, and the clusters obtained are alternately optimized through several iterations.

5. The method according to claim 4, wherein:

the unsupervised cognitive model is executed so as to achieve predefined structural properties of the clusters.

6. The method according to claim 5, wherein:

the predefined structural properties are achieved based on silhouette scores of the clusters.

7. The method according to claim 6, wherein each of said iterations comprises:

at the first stage:

obtaining representations of the input datasets; and computing a first loss with the first loss function, based on the representations obtained;

at the second stage:

running a k-means algorithm based on the previously obtained representations;

optimizing a number of clusters based on the silhouette scores obtained for the clusters;

computing a second loss with the second loss function; and computing a current composed loss based on the first loss and the second loss; and deciding whether to stop the training by comparing the current composed loss with a previous composed loss, as obtained during a previous one of the iterations.

8. The method according to claim 1, wherein:

the encoder is configured as an exponentially dilated, causal convolutional neural network.

9. The method according to claim 8, wherein:

the unsupervised cognitive model is designed as a single network, and the second stage is implemented by outer neural layers of the cognitive model, the outer neural layers connected in output of the first stage.

10. The method according to claim 9, wherein:

the first stage includes at least two convolution blocks; and each of the at least two convolution blocks comprises one or more dilated causal convolutional layers.

11. The method according to claim 10, wherein:

the first stage further includes a hierarchy of neural layers arranged in output of each of the dilated causal convolutional layers.

12. The method according to claim 11, wherein:

the hierarchy of neural layers includes a weight normalization layer and an activation layer.

13. The method according to claim 12, wherein:

the activation layer is a leaky rectified linear unit.

14. The method according to claim 12, wherein:

the first stage further comprises a global max pooling layer arranged in an output of the at least two convolution blocks.

15. The method according to claim 14, wherein:

the first stage further comprises a linear transformation layer in an output of the global max pooling layer.

16. The method according to claim 1, wherein the method further comprises:

identifying types of anomalies corresponding to each of the clusters obtained.

17. The method according to claim 1, wherein:

the method further comprises, prior to accessing the input datasets and executing the unsupervised cognitive model, monitoring the computerized system to detect said anomalies.

18. A computer program for clustering anomalies detected in a computerized system, the computer program product comprising:

one or more computer-readable tangible storage media and program instructions stored on at least one of the one or more tangible storage media, the program instructions executable by a processor capable of performing a method, the method comprising:

accessing input datasets corresponding to detected anomalies of the computerized system, wherein the anomalies span respective time windows and each of the corresponding input datasets comprises a set of timeseries of key performance indicators extending over a respective one of the time windows;

loading an unsupervised cognitive model, wherein the model includes a first stage and a second stage, wherein the first stage includes an encoder designed to learn fixed-size representations of given datasets and the second stage is a clustering stage, wherein the unsupervised cognitive model is trained in an iterative and alternate manner, based on a combined loss functions, using an early stopping strategy, wherein the model is established by combining a stacked dilated causal convolutional neural network (CNN) encoder-only architecture with a composed loss function with cosine similarity-based negative sampling and the iterative training; and executing the unsupervised cognitive model based on the input datasets accessed for the first stage to learn fixed-size representations of the input datasets and the second stage to cluster the learned representations, to obtain clusters of anomalies.

19. The computer program according to claim 18, wherein:

the unsupervised cognitive model involves a composed loss function combining a first loss function and a second loss function, wherein the first loss function and the second loss function are designed for optimizing the representations and the clusters, respectively, and, in operation, executing the first stage and the second stage, iteratively, to decrease the composed loss function.

20. The computer program according to claim 18, wherein:

the first loss function is designed as a triplet loss function ensuring that the representation learned for a reference portion of each dataset of the input datasets is, on average, closer to the representations learned for distinct portions of said each dataset than to the representations learned for other portions of other ones of the input datasets, wherein each of the reference portion, the distinct portions, and the other portions, corresponds to a respective time segment.

\* \* \* \* \*